Aug. 30, 1949.  B. W. ANDRUS  2,480,536
INTERMITTENT FEED-AND-CUT WOOD CUTTING SAWS
Filed Aug. 16, 1944  2 Sheets-Sheet 1
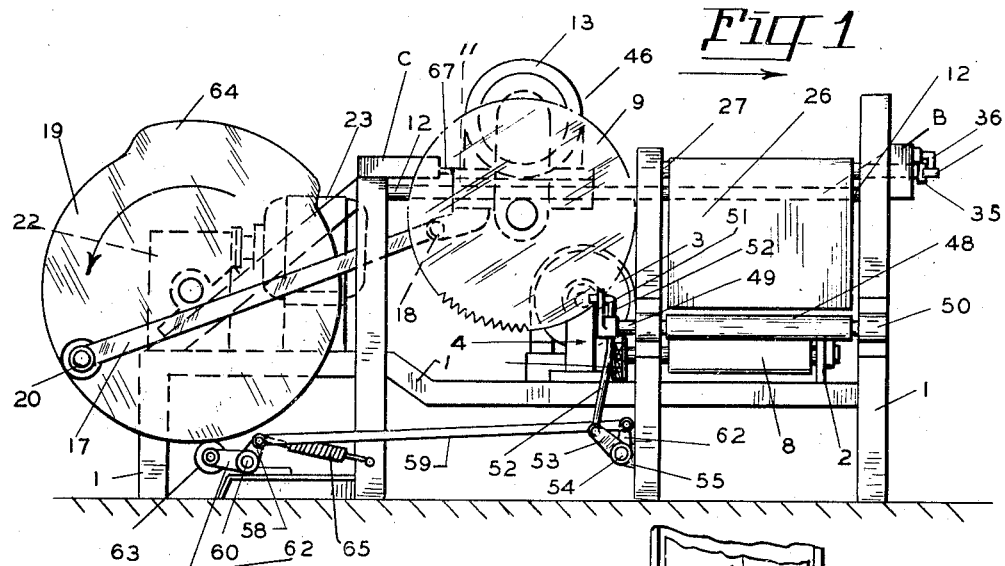
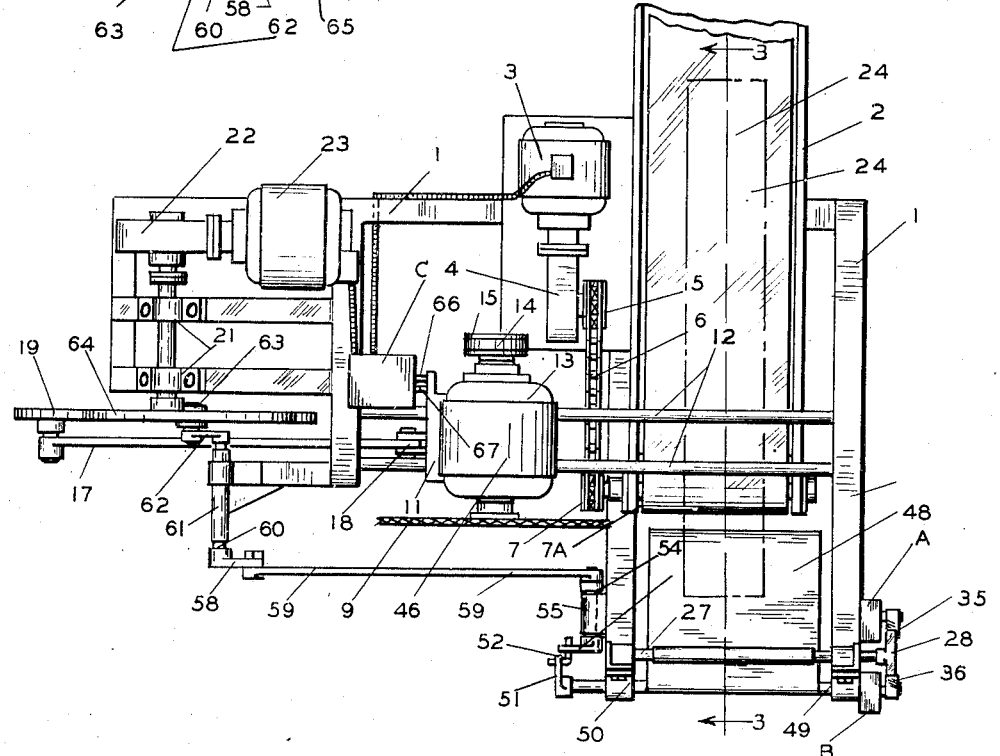
INVENTOR
BUDD W. ANDRUS
ATTORNEY

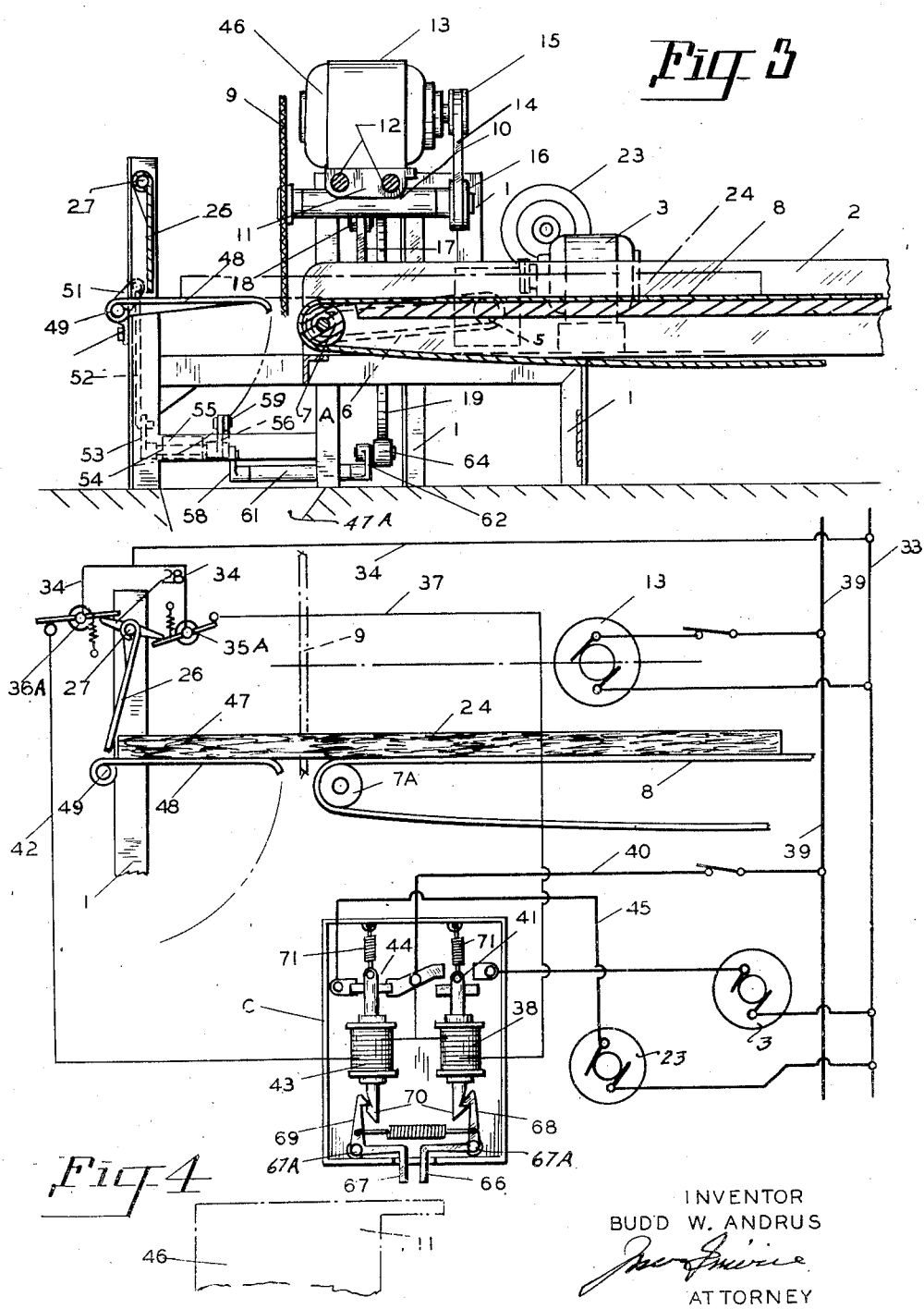

Patented Aug. 30, 1949

2,480,536

UNITED STATES PATENT OFFICE 2,480,536

INTERMITTENT FEED-AND-CUT WOOD CUTTING SAWS

Budd W. Andrus, Eugene, Oreg.

Application August 16, 1944, Serial No. 549,685

4 Claims. (Cl. 143—47)

1

This invention relates to wood cutting saws and is primarily adapted for cutting slab wood into lengths adapted to be burned in stoves, furnaces and the like.

The primary object of the invention is to feed slabs through a cut off saw by a conveyor wherein the conveyor moves the slab to cut off position at which time the end of the slab will operate an electric switch system that will stop the movement of the conveyor and start the saw carriage across the slab, and on the return trip of the saw carriage a suitable operating mechanism will deliver the cut off portion of the slab into a delivery chute.

I have found that in the cutting off of slab wood it is most desirable to hold the cut off portion of the slab in alignment with the slab until the saw has completely passed through the cut, at which time it is most desirable to discharge this cut off piece of slab wood away from the return travel of the saw, which eliminates interfering with the return travel of the saw to its initial starting position.

These and other incidental objects will be apparent in the drawings, specification and claims.

Referring to the drawings:

Figure 1 is an end view of my new and improved wood saw.

Figure 2 is a plan view of Figure 1.

Figure 3 is a sectional side view of my new and improved wood saw, taken on line 3—3 of Figure 2, looking in the direction indicated.

Figure 4 is a diagrammatical layout of the electric control system for operating the motors of the wood saw.

In the drawings:

The wood saw consists of suitable framework 1, having a conveyor 2 mounted therein. The conveyor is driven by a suitable power unit as electric motor 3, reduction gear 4 and sprocket 5, driving the chain 6 which in turn drives the sprocket 7, roller 7A and conveyor belt 8. A circular saw 9 is journalled to a cross bearing 10, which forms part of a sliding motor base 11. The base 11 is slidably mounted upon supporting bars 12, which are mounted within the framework of the machine by any suitable fastening means.

The saw 9 is driven by the motor 13 through the belt 14, which is trained about the pulleys 15 and 16. By mounting the saw in this manner a relatively small diameter saw can be used still providing for a maximum depth of cut. The sliding base 11 and the motor 13 are moved horizontally of the bars 12 by a connecting rod 17, which is pivotally connected to the base 11 at 18

2 and to the driving disk 19 by the bearing 20. The driving disk 19 is mounted within suitable bearings 21 and is driven through a reduction gear 22 and motor 23.

In the operation of my new and improved wood saw the conveyor belt 8 moves the slab 24, as indicated by the broken lines in Figures 2 and 3 towards the pivotally mounted end gate 26. In Figure 4 I illustrate a slab having moved the end gate 26 from a vertical position. The end gate 26 is fixedly mounted to the shaft 27, which has a switch operating bar 28 fixedly mounted thereon; as the gate 26 is moved to the position as illustrated in Figure 4 the switch operating bar will operate the switch arms 35 and 36 within the switch boxes A and B closing the following electric circuit. Energy will flow from the supply line 33, through the conductor 34 and into the switches 35A and 36A, through the switch 35A the current will flow into the conductor 37 through the solenoid 38 and back to the supply line 39 through the conductor 40. When this happens the motor switch 41 will be opened by the solenoid 38. The motor switch 41 controls the electric circuit through the motor 3, which drives the conveyor 2 thereby stopping the conveyor.

When the switch arm 36 was operated by a switch bar 28, electric energy will flow from the conductor 34 into the switch 36A and out through the conductor 42 to the solenoid 43, which will close the motor switch 44 as illustrated in Figure 4. Current will then flow through the switch 44, through conductor 45 and motor 23 back to the supply line. This will start the motor 23 which will revolve the driving disk 19 in the direction of the arrow, moving the connecting rod 17 towards the motor base 11, thereby forcing the saw assembly in the direction of the arrow in Figure 1 through the slab cutting off the end 47.

When the saw has passed through the cut it is desirable to discharge the piece 47 away from the machine. The piece 47 rests upon a platform 48 which is mounted to a cross shaft 49 working within suitable bearings 50 mounted to the framework of the machine. The platform 49 is held in a horizontal position by a system of links and lever arms as follows.

Fixedly mounted to the end of the shaft 49 is an arm 51, this arm is connected to a pivotally mounted arm 52 by a link 53. The arm 52 is mounted to a cross shaft 54 journalled in a bearing 55. The cross shaft has an arm 56 fixedly mounted to its opposite end which is connected to the crank arm 58 by link 59. The crank arm 58 is fixedly mounted to the shaft 60, which is journailed within a suitable cross bearing 61 mounted to the frame of the machine.

Fixedly mounted to the opposite end of the shaft 60 is a crank arm 62 which has a cam roller 63 rotatably mounted thereon. When the cam 64, forming part of the driving disk 19, reaches the roller 63 it will operate the linkage assembly above described so as to lower the platform 48 from under the cut portion of the piece 47 of the slab 24 allowing the portion 47 of the slab to be delivered into a chute 47A from where it is delivered by any suitable conveying system away from the machine.

Further rotation of the driving disk 19 will pull the connecting rod 17 and the saw assembly 46 back past the slab to the position shown in Figure 1. Before the saw assembly reaches this position the cam 64 will allow the cam roller 63 to move the linkage connections to the platform 48, returning the platform to a horizontal position by the action of the spring 65. By allowing the pieces of the slab 47 to be moved out of the way before the saw returns through the cut, jamming of the saw is prevented which has heretofore interfered with the operation of machines of this kind.

This is one of the outstanding objects of my invention, the holding of the end 47 of the slab in alignment with the slab until the cut has been completely made, then discharging this piece away from the path of the saw on its return through the cut. When the saw assembly 46 approaches its final return travel the base 11 will contact the bell cranks 66 and 67, pivoting them about their pivots 67A, unlatching the latches 68 and 69 from the solenoid cores 70 permitting the springs 71 to close the electric switch 41 and open the switch 44. This will start the conveyor motor 3 and stop the motor 23 from moving the saw assembly 46. The slab will then be moved forward until it reaches the gate 26 when another cycle of operation will begin as heretofore described. The latches 68 and 69 are provided for holding the switches 41 and 44 in the proper position after the solenoids 38 and 43 have been energized by the operation of the switches 35A and 36A. The switches 35A and 36A are only momentarily operated, therefore suitable holding latches 68 and 69 have been provided for holding the switches 41 and 44 in a fixed position until the cycle of operation has been completed.

The following is a brief description of the operation of my new and improved wood saw. Slabs are placed on the conveyor belt 8 at a distant point end to end, the belt 8 brings the slabs to the cutting position at which time the end of the slab will contact a switch operating gate which opens the electric circuit of the conveyor motor 3 driving the conveyor belt, 8 at the same time closes a switch to start the motor 23, revolving the driving disk 19 and moving the saw assembly 46 across the slab. The saw 9 being driven constantly at all times. After the saw 9 completes its cut through the slab the platform 49 is moved out from underneath the slab portion 47, discharging the same into a suitable chute or conveyor. The saw assembly 46 is then moved by the driving disk and its connecting rod 19 back past the end of the slab on the conveyor to its starting position as illustrated in Figures 1 and 2, this completes a cycle of operation. The conveyor 8 being stationary while the saw assembly 46 moves through the slab and back again.

I do not wish to be limited to the exact mechanical and electrical construction as illustrated, as other equivalents may be used, still coming within the scope of my claims.

I claim:

1. A wood sawing machine comprising, in combination, a frame, a horizontal conveyor on said frame for feeding wood longitudinally, a platform pivotally mounted about an axis transverse of the direction of feed on said frame beyond the end of said conveyor to be horizontally positioned at the level of said conveyor to support the leading end of the wood during the cutting operation, the edge of said platform when in horizontal position being spaced from the end of said conveyor to define a saw path transverse the movement of said conveyor, a rotary cut-off saw, means for driving said saw, a saw and drive means support slidably mounted on said frame for reciprocal movement to move said saw through said saw path to cut the wood transversely of its length, means for moving said support through its reciprocal movement, and means operative upon the completion of the cutting stroke of movement of said support for pivoting said platform to discharge the severed part of the wood.

2. A wood sawing machine comprising, in combination, a frame, a horizontal conveyor on said frame for feeding wood longitudinally, a platform pivotally mounted about a horizontal axis at right angles to the direction of feed on said frame beyond the end of said conveyor to be horizontally positioned at the level of said conveyor to support the leading end of the wood during the cutting operation, the edge of said platform when in horizontal position being spaced from the end of said conveyor to define a saw path transverse the movement of said conveyor, a rotary cut-off saw, means for driving said saw, a saw and drive means support slidably mounted on said frame for reciprocal movement to move said saw through said saw path to cut the wood transversely of its length, means for moving said support through its reciprocal movement, and means operative by said support moving means upon the completion of the cutting stroke of movement of said support for pivoting said platform to discharge the severed part of the wood.

3. A wood sawing machine comprising, in combination, a frame, a horizontal conveyor on said frame for feeding wood longitudinally, means for driving said conveyor, a platform pivotally mounted on said frame beyond the end of said conveyor to be horizontally positioned at the level of said conveyor to support the leading end of the wood during the cutting operation, the edge of said platform when in horizontal position being spaced from the end of said conveyor to define a saw path transverse the movement of said conveyor, a rotary cut-off saw, means for driving said saw, a saw and drive means support slidably mounted on said frame for reciprocal movement to move said saw through said saw path to cut the wood transversely of its length, means for moving said support through its reciprocal movement, means operative by said support moving means upon the completion of the cutting stroke of movement of said support for pivoting said platform to discharge the severed part of the wood, a control member above said platform for engagement by the leading end of said wood, and means controlled by said control member for normally activating said conveyor drive means and de-activating said support moving means but operative upon movement of said control member by the wood to deactivate said conveyor means and activate said support moving means.

4. A wood sawing machine comprising, in combination, a frame, a horizontal conveyor on said frame for feeding wood longitudinally, a platform mounted on said frame beyond the end of said conveyor to be horizontally positioned at the level of said conveyor to support the leading end of the wood during the cutting operation, said platform being pivotally mounted at its edge that is remote from said conveyor, the free edge of said platform when in horizontal position being spaced from the end of said conveyor to define a saw path transverse the movement of said conveyor, a rotary cut-off saw, means for driving said saw, a saw and drive means support slidably mounted on said frame for reciprocal movement to move said saw through said saw path to cut the wood transversely of its length, means for moving said support through its reciprocal movement, and means operative by said support moving means upon the completion of the cutting stroke of movement of said support for pivoting said platform to discharge the severed part of the wood.

BUDD W. ANDRUS.

REFERENCES CITED

The following references are of record in the file of this patent:

UNITED STATES PATENTS

| Number | Name | Date |
|---|---|---|
| 1,721 | McDowell | Aug. 12, 1840 |
| 342,918 | Loggie | June 1, 1886 |
| 640,458 | Farr | Jan. 2, 1900 |
| 764,717 | Foshee | July 12, 1904 |
| 771,836 | Schantz | Oct. 11, 1904 |
| 996,386 | Williams | June 27, 1911 |
| 1,177,705 | Johnson | Apr. 4, 1916 |
| 1,493,831 | Violette | May 13, 1924 |
| 1,576,025 | Baumhover | Mar. 9, 1926 |
| 1,813,291 | Herbold | July 7, 1931 |
| 1,856,169 | Rosener et al. | May 3, 1932 |
| 2,353,239 | Horstkotte | July 11, 1944 |
| 2,393,617 | De Spain | Jan. 29, 1946 |